United States Patent [19]
Dries et al.

[11] Patent Number: 5,997,968
[45] Date of Patent: Dec. 7, 1999

[54] PEELABLE, HEAT-SEALABLE, MULTILAYERED POLYOLEFIN FILM, PROCESS FOR THE PRODUCTION THEREOF, AND THE USE THEREOF

[75] Inventors: Thomas Dries, Schwabenheim; Lothar Höppenstein, Eltville; Adolf Wilhelm, Wiesbaden, all of Germany

[73] Assignee: Hoechst Trespaphan GmbH, Germany

[21] Appl. No.: 08/770,289

[22] Filed: Dec. 20, 1996

[30] Foreign Application Priority Data

Dec. 27, 1995 [DE] Germany ............... 195 48 789

[51] Int. Cl.$^6$ ............... B32B 27/08; B32B 27/20; B32B 27/32
[52] U.S. Cl. ............... 428/35.7; 428/212; 428/323; 428/336; 428/515; 428/516; 428/523; 206/524.1; 264/173.12
[58] Field of Search ............... 428/35.7, 212, 428/323, 330, 331, 336, 41.3, 42.2, 42.3, 41.8, 41.9, 347, 349, 355 RA, 355 EN, 515, 516, 523, 910; 264/173.12; 525/240; 229/240, 242, 245, 80, 80.5; 206/529.1

[56] References Cited

U.S. PATENT DOCUMENTS

| | | | |
|---|---|---|---|
| 4,189,519 | 2/1980 | Ticknor | 428/476 |
| 4,375,989 | 3/1983 | Makinen | 106/300 |
| 4,377,616 | 3/1983 | Ashcraft et al. | 428/213 |
| 4,447,271 | 5/1984 | Howard et al. | 106/300 |
| 4,666,778 | 5/1987 | Hwo | 428/412 |
| 4,771,935 | 9/1988 | Hekal | 229/3.5 R |
| 4,784,885 | 11/1988 | Carespodi | 428/36.8 |
| 4,937,139 | 6/1990 | Genske et al. | 428/349 |
| 4,960,637 | 10/1990 | Biczenczuk | 428/314.4 |
| 5,160,767 | 11/1992 | Genske et al. | 428/35.98 |
| 5,236,622 | 8/1993 | Yoneda et al. | 252/309 |
| 5,236,680 | 8/1993 | Nakazawa et al. | 423/328.1 |
| 5,326,625 | 7/1994 | Schuhmann et al. | 428/215 |
| 5,366,796 | 11/1994 | Murschall et al. | 428/216 |
| 5,498,474 | 3/1996 | Schuhmann et al. | 428/323 |

FOREIGN PATENT DOCUMENTS

| | | |
|---|---|---|
| 2153752 | 4/1996 | Canada . |
| 0 044 515 | 1/1982 | European Pat. Off. . |
| 0078633 | 5/1983 | European Pat. Off. . |
| 0 083 495 | 7/1983 | European Pat. Off. . |
| 0 236 945 | 9/1987 | European Pat. Off. . |
| 0 367 613 | 5/1990 | European Pat. Off. . |
| 0 475 110 | 3/1992 | European Pat. Off. . |
| 0 538 747 | 4/1993 | European Pat. Off. . |
| 3801535 | 7/1988 | Germany . |

*Primary Examiner*—Vivian Chen
*Attorney, Agent, or Firm*—Connolly Bove Lodge & Hutz

[57] ABSTRACT

A multilayer polyolefin film comprising of at least three coextruded layers comprising an opaque base layer, an intermediate layer, and an outer peelable surface layer composed of two incompatible polyolefins, wherein the intermediate layer contains at least 80% by weight of a polyolefin having a lower melting point or lower glass transition temperature than the polyolefin forming the base layer.

21 Claims, No Drawings

PEELABLE, HEAT-SEALABLE, MULTILAYERED POLYOLEFIN FILM, PROCESS FOR THE PRODUCTION THEREOF, AND THE USE THEREOF

The present invention relates to a peelable, oriented, opaque, multilayered polyolefin film comprising at least three coextruded polyolefinic layers comprising a base layer, an intermediate layer and a top layer.

The invention furthermore relates to a process for the production of the peelable multilayer film and to the use of the film.

BACKGROUND ART

Polyolefin films are widely used as packaging films. The success of these materials is based on the good optical and mechanical properties and on the ease of welding of the films. In addition to welding, heat-sealing of films has increased in importance. Heat-sealable films preferably have a top layer of a polymer with a lower crystallite melting point than the polymer of the base layer of the film. For sealing, the film layers are laid one on top of the other and warmed only to from 10 to 20 C. below the crystallite melting point, i.e. the top layers are not completely melted. The adhesion achieved between the heat-sealing layers is significantly less than if the same material is welded, but is sufficient for many applications (Kunststoff-Handbuch [Plastics Handbook], Volume IV, Carl Hanser Verlag, Munich, 1969, pages 623 to 640).

The seal seams in many cases have greater mechanical strength than the films themselves, so that opening of a sealed film package results not only in the latter being torn and destroyed in the seal seam, but rather in the tear continuing in the film itself and then tearing further in an uncontrolled manner. For this reason, heat-sealable raw materials are also replaced by peelable top layers applied to film surfaces. The peelable top layers offer firstly good heat-sealing properties, but at the same time also offer the possibility of opening the seal seam again in a controlled manner without destroying the sealed materials. This opening of the seal seam takes place with cohesive fracture in the peel layer, which ideally take place only in the peel layer.

Peelable raw materials are known from the prior art. For example, the product datasheet "Novolen VP 9201" describes an olefinic polymer which is suitable for the production of peelable, coextruded heat-sealable layers on polypropylene films. The heat-sealing/peel layers are glossy to silk-matt and are predominantly used on pigmented/opaque support layers.

U.S. Pat. No. 4,666,778 describes transparent, peelable films having good seal seam strength and low haze. The peelable top layer comprises a polymer mixture of ethylenic polymers or ethylenic copolymers containing small amounts of propylene polymers and butylene polymers. The good transparency of the films is favorable for some applications, but is not always desired.

The prior art also discloses nontransparent, i.e. opaque or translucent films, which, depending on the top layer applied, can be heat-sealable or non-heat-sealable.

Opaque films contain in at least one layer pigments or vacuole initiating particles or a combination thereof, causing the films to have significantly reduced light transmission compared with transparent films. For the purposes of the present invention, "opaque film" means a nontransparent film whose light transparency, measured in accordance with ASTM D 1003-77, is at most 70%, preferably at most 50%.

Vacuole initiating particles are particles which are incompatible with the polymer matrix and result in the formation of vacuole-like cavities when the films are stretched, the size, type and number of the vacuoles depending on the material and on the size of the solid particles and on the stretching conditions, such as stretching ratio and stretching temperature. The vacuoles reduce the density and give the films a characteristic mother-of-pearl-like, opaque appearance caused by light scattering at the vacuole/polymer matrix interfaces. In general, the mean particle diameter of the vacuole initiating particles is from 0.02 to 10 $\mu$m.

EP-A-0 083 495 describes an opaque, biaxially oriented film having a satinized appearance and a surface gloss of greater than 100% and containing at least one spherical solid particle per vacuole. In addition, the film has on both surfaces of the core layer a pore-free, transparent, thermoplastic cladding layer which has a thickness which determines the appearance of the film. An example given of a material for the solid particles is nylon. The particles generally have a diameter of greater than 1 $\mu$m. In this film too, the opacity is determined principally by the amount of solid particles and the process parameters during biaxial orientation.

EP-A-0 475 110 describes biaxially oriented white films having a support layer based on polypropylene polymers and top layers on one or both sides. The support layer contains coated $TiO_2$ particles whose coating contains at least one inorganic oxide and at least one organic compound. The films are distinguished by good mechanical properties and a high, permanent degree of whiteness.

EP-A-0 538 747 describes biaxially oriented polypropylene films having a matt top layer. The top layer comprises propylene copolymers and/or terpolymers and an HDPE. The films are distinguished by low gloss and high haze, ensuring the matt appearance.

EP-A-0 367 613 describes an opaque film having a vacuole-containing layer and a top layer having a rough, inscribable surface. The top layer contains a first polymer having an MFI of 1 g/10 min and a second polymer which is incompatible with the first.

U.S. Pat. No. 5,500,265 discloses a peelable film comprising the invention relates to a peelable film comprising an olefinic base layer and a skin layer on at least one surface of thge base layer, the skin layer comprising a blend of a butylene polymer with another olefin polymer or a polymer of butylene and at least one other olefin and a coating layer on the skin layer. Said coating layer is a heatsealable acrylic polymer or a polyvinylidene polymer. Said film is disadvantagous in that it cannot be recylced in the production process due to the acrylics or PVC contained. Also its production is expensive because the coating is applied in a separate step after the production of the film and for most coatings it is necessary to apply a primer between the skin layer and the coating. The film peels between the skin layer and the coating. Thereby residues of the coating remain on the substrate after peeling, which is specifically undesired if the film is used on yoghurt cups.

It has been found that the opaque carrier films are only of limited suitability for application of peel layers. Opaque films with peel layers have major disadvantages in certain applications. In particular when used as lid films for food containers, problems occur that are connected with the vacuole-containing structure. After removal from the container, the lid film leaves behind white shred-like skins on the embossing rim of the container on to which the film has been welded. It was found during investigations concerning the present invention that these film residues on the container rim are caused by the poor tear propagation strength of the film. On removal of the lid film, the peel layer tears as intended, but this tear then propagates in an uncontrolled manner in the other layers of the film. This leaves film residues adhering to the container rim which cannot easily be identified by the consumer and can under certain circumstances cause nausea. For marketing reasons, such effects are unacceptable. The known opaque films having peel layers can therefore hardly be used for this application.

It is known that the tear propagation strength of opaque, peelable films can be increased by only pigments which do not form vacuoles as fillers for opacifying the film. This teaching is described in the European Application with the Application No. P 44 24 604.8-16. However, it has been found that this measure is inadequate. In spite of the fact that the internal strength of this film is greater than in a film containing vacuoles, the tear propagation strength is inadequate always to prevent the skin formation described when used as a lid film.

During investigations concerning the present invention, it was found that the skin formation can be avoided if the peel layer is applied in a thickness of greater than 5 $\mu$m. However, this solution to the problem is not advantageous, since the peel material is very expensive. Thick layers of peel raw material makes the film so expensive that it can no longer be offered at a commercial price. In addition, thick peel layers make it very difficult to match the seam strengths to various applications.

SUMMARY OF THE INVENTION

The object of the present invention was to provide an opaque, peelable film which is suitable for use as a lid film for food containers. In particular, the film should be removable cleanly after welding to the embossing rim of the container, ie. the film must not leave behind any skins or other film residues. The other film properties required in view of said use must not be impaired. In particular, the film must still have adequate seal or peel seam strength, and its optical properties, in particular with respect to opacity and whiteness, must not be adversely affected.

The object on which the invention is based is achieved by a multilayer film of the generic type mentioned at the outset, wherein said base layer is opaque and said top layer is a peelable top layer comprising two incompatible polyolefins, and said interlayer is applied between said opaque base layer and said peelable top layer and is a flexible interlayer.

It was found that for coextruded peelable films with polyolefinic peel layers delamination and residues on the substrate can only be avoided if a soft or flexible intermediate layer is provided between base and top layer. If the polyolefin of the indermediate layer is not softer than the polyolefin of the base layer the film cannot be peeled properly from the substrate.

DETAILED DESCRIPTION

For the purposes of the present invention, the term "opaque film" is defined to mean a non-transparent film whose light transparency (ASTM-D 1003-77) is at most 70%, preferably at most 50%.

The opaque film according to the invention is peelable without any acrylic polymers or polyvinylidene chloride. The film peels between the outermost peelable top layer and the substrate. It does not peel between the coextruded layers, whereby residues on the substrate are avoided.

The opaque base layer of the novel multilayer film essentially comprises a polyolefin, preferably a propylene polymer, and opacifying fillers and, if desired, further additives in effective amounts in each case. In general, the base layer comprises at least 50% by weight, preferably from 60 to 99% by weight, in particular from 70 to 98% by weight, of the polyolefin, in each case based on the weight of the layer.

Preferred polyolefins are propylene polymers. These propylene polymers generally comprise from 90 to 100% by weight, preferably from 95 to 100% by weight, in particular from 98 to 100% by weight, of propylene units and have a melting point of 120 C. or above, preferably from 150 to 170 C., and generally have a melt flow index of from 0.5 to 8 g/10 min, preferably from 2 to 5 g/10 min, at 230 C. and a force of 21.6 N (DIN 53 735). Isotactic propylene homopolymers having an atactic content of 15% by weight or less, copolymers of ethylene and propylene having an ethylene content of 10% by weight or less, copolymers of propylene and $C_4$–$C_8$-olefins having an -olefin content of 10% by weight or less, terpolymers of propylene, ethylene and butylene having an ethylene content of 10% by weight or less and a butylene content of 15% by weight or less are preferred propylene polymers for the core layer, particular preference being given to isotactic propylene homopolymers. The percentages by weight given are based on the particular polymer.

Also suitable is a mixture of said propylene homopolymers and/or copolymers and/or terpolymers and other polyolefins, in particular comprising monomers having 2 to 6 carbon atoms, where the mixture comprises at least 50% by weight, in particular at least 75% by weight, of propylene polymer. Other polyolefins which are suitable in the polymer mixture are polyethylenes, in particular HDPE, LDPE, VLDPE and LLDPE, where the proportion of these polyolefins does not exceed 15% by weight in each case, based on the polymer mixture.

The opaque base layer of the film contains fillers in a maximum amount of 40% by weight, preferably from 1 to 30% by weight, in particular from 2 to 20% by weight, based on the weight of the opaque layer. For the purposes of the present invention, fillers are pigments and/or vacuole-initiating particles.

Pigments for the purposes of the present invention are incompatible particles which result in essentially no vacuole formation during stretching of the film. The coloring action of the pigments is caused by the particles themselves. The term "pigments" is generally associated with a mean particle diameter in the range from 0.01 to a maximum of 1 $\mu$m and covers both "white pigments", which give the films a white color, and "colored pigments", which give the film a colored or black color. In general, the mean particle diameter of the pigments is in the range from 0.01 to 1 $\mu$m, preferably from 0.01 to 0.7 $\mu$m, in particular from 0.01 to 0.4 $\mu$m.

Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, preference being given to white pigments such as calcium carbonate, silicon dioxide, titanium dioxide and barium sulfate.

The titanium dioxide particles generally comprise at least 95% by weight of rutile and are preferably employed with a coating of inorganic oxides, as is usually used as a coating for $TiO_2$ white pigment in papers or paints for improving the light fastness. Particularly suitable inorganic oxides include the oxides of aluminum, silicon, zinc and magnesium or mixtures of two or more of these compounds. They are precipitated from water-soluble compounds, for example alkali metal aluminates, in particular sodium aluminate, aluminum hydroxide, aluminum sulfate, aluminum nitrate, sodium silicate or silica, in the aqueous suspension. Coated $TiO_2$ particles are described, for example, in EP-A-0 078 633 and EP-A-0 044 515.

The coating may also contain organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from 1 to 12 g, in particular from 2 to 6 g, of inorganic oxides, and if desired additionally from 0.5 to 3 g, in particular from 0.7 to 1.5 g, of organic compounds, in each case based on 100 g of $TiO_2$ particles. It has proven particularly advantageous for the $TiO_2$ particles to be coated with $Al_2O_3$ or with $Al_2O_3$ and polydimethylsiloxane.

For the purposes of the present invention, "vacuole-initiating fillers" are taken to mean solid particles which are incompatible with the polymer matrix and result in the formation of vacuole-like cavities when the films are stretched, the size, type and number of vacuoles being dependent on the size of the solid particles and on the stretching conditions, such as stretching ratio and stretching temperature.

The vacuoles reduce the density and give the films a characteristic mother-of-pearl, opaque appearance caused by light scattering at the "vacuole/polymer matrix" interfaces. The light scattering at the solid particles themselves generally contribute relatively little to the opacity of the film. In general, the vacuole-initiating fillers have a minimum size of 1 μm in order to result in an effective amount, ie. opacifying amounts, of vacuoles. In general, the mean particle diameter of the particles is from 1 to 6 μm, preferably from 1.5 to 5 μm. The chemical character of the particles plays a secondary role.

Conventional vacuole-initiating fillers are inorganic and/or organic materials which are incompatible with polypropylene, such as aluminum oxide, aluminum sulfate, barium sulfate, calcium carbonate, magnesium carbonate, silicates, such as aluminum silicate (kaolin clay) and magnesium silicate (talc), and silicon dioxide, of which preference is given to calcium carbonate and silicon dioxide. Suitable organic fillers are the conventional polymers which are incompatible with the polymer of the base layer, in particular those such as HDPE, copolymers of cyclic olefins, such as norbornene or tetracyclododecene, with ethylene or propene (COC), as described in EP-A-0 623 463, polyesters, polystyrenes, polyamides and halogenated organic polymers, preference being given to polyesters, such as, for example, polybutylene terephthalates, and cycloolefin copolymers. For the purposes of the present invention, "incompatible materials or incompatible polymers" is taken to mean that the material or polymer exists as separate particles or as a separate phase in the film.

The base layer contains pigments in an amount of from 0.5 to 10% by weight, preferably from 1 to 8% by weight, in particular from 1 to 5% by weight. Vacuole-initiating fillers are present in an amount of from 0.5 to 25% by weight, preferably from 1 to 15% by weight, in particular from 1 to 10% by weight.

The novel multilayer film includes at least one interlayer applied between the opaque base layer and the peelable top layer. In accordance with the invention, this interlayer is made from polyolefins which are "softer" than the polyolefins of the base layer. Criteria for the selection of a soft material are the melting point Tm, the glass transition temperature Tg or the crystallinity or Shore hardness of the polyolefins.

For crystalline polyolefins, the more flexible polyolefin of the interlayer should have a lower melting point Tm than the polyolefin of the base layer.

For amorphous polyolefins, analogously, the glass transition temperature Tg of the polyolefin of the interlayer is lower than the Tg of the polyolefin of the base layer. Tm or Tg should advantageously differ by at least 10 C. Tm or Tg of the interlayer polyolefin is preferably from 15 to 60 C., in particular from 30 to 50 C., lower than the Tm or Tg of the polyolefin of the base layer.

In general, the polyolefin of the interlayer has a melting point of at most 165 C., preferably from 80 to 140 C., in particular from 100 to 135 C. In general, the interlayer comprises at least 80% by weight, preferably from 90 to 100% by weight, in particular from 95 to 99% by weight, in each case based on the weight of the interlayer, of the more flexible polyolefin. If desired, additives in effective amounts in each case can be added to the interlayer.

Suitable flexible polyolefins having a lower melting point are polyolefins made from olefins having 2 to 10 carbon atoms, of which preference is given to the polymers mentioned below made from ethylene, propylene and butylene units. Flexible polyolefins of the interlayer are preferably
    ethylene homopolymers or
    copolymers of
        ethylene and propylene or
        ethylene and butylene or
        propylene and butylene or
        ethylene and another -olefin having 5 to 10 carbon atoms or
        propylene and another -olefin having 5 to 10 carbon atoms or
    terpolymers of
        ethylene and propylene and butylene or
        ethylene and propylene and another -olefin having 5 to 10 carbon atoms or
mixtures of two or more of said homopolymers, copolymers and terpolymers or blends of two or more of said homopolymers, copolymers and terpolymers, if desired mixed with one or more of said homopolymers, copolymers and terpolymers.
    Particular preference is given to
    copolymers of
        ethylene and propylene or
        ethylene and 1-butylene or
        propylene and 1-butylene or
    terpolymers of
        ethylene and propylene and 1-butylene or
mixtures of two or more of said particularly preferred homopolymers, copolymers and terpolymers or blends of two or more of said particularly preferred homopolymers, copolymers and terpolymers, if desired mixed with one or more of said homopolymers, copolymers and terpolymers, especially
    random ethylene-propylene copolymers having an ethylene content of from 2 to 10% by weight, preferably from 5 to 8% by weight, or random propylene-1-butylene copolymers having a butylene content of from 4 to 25% by weight, preferably from 10 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the total weight of the terpolymer, or blends of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend.

The copolymers and terpolymers described above generally have a melt flow index of from 1.5 to 30 g/10 min, preferably from 3 to 15 g/10 min. The above-described blend of copolymers and terpolymers has a melt flow index of from 5 to 9 g/10 min, the melt flow indices indicated being measured at 230 C. and a force of 21.6 N (DIN 53 735). The melting point is generally in the range from 120 to 140 C.

The polyethylenes mentioned preferably have an ethylene content of from 80 to 100% by weight, preferably from 95 to 100% by weight. HDPE, LDPE, LLDPE and the like are particularly suitable.

Of the abovementioned flexible polyolefins of the interlayer, preference is given to those which additionally have a low crystallinity of less than 40% by weight, preferably from 10 to 30% by weight. In particular, the crystallinity of the flexible polyolefin should be lower than the crystallinity of the polyolefin of the base layer.

Surprisingly, peelable, opaque films having underneath the outermost peel layer an interlayer comprising flexible olefinic polymers have significantly improved tear propagation strength and improved peel properties. Films having this specific layer structure are highly suitable for use as lid films for food containers. They have firstly proved seam strengths when heat-sealed to containers made of polyolefin, preferably polypropylene, and nevertheless the film, entirely unexpectedly, can be peeled off without formation of the undesired skins. Any person skilled in the art would have expected that an improvement in the seam strength would mean that the film had an even greater tendency to tear during peeling and the undesired skins would occur to a greater extent. Surprisingly, this is not the case. It is assumed that the flexible, low-melting material of the interlayer forms a flexible cushioning zone for the peel layer which has a favorable action in two respects. Firstly, anchoring of the peel layer to the interlayer is better, and secondly, the peel layer is decoupled from the opaque base layer. The result of this is that the peel layer, which has low tear strength, but relatively high tear propagation strength, is decoupled from the opaque base layer with a lower tear propagation strength than the peel seam. On opening of the peel seam, the film tears as intended in the peel layer, but this tear no longer propagates in the base layer of the film. This means that the interlayer successfully prevents tear propagation into the base layer, but nevertheless the base layer is still the weakest link in the chain, ie. has the lowest tear propagation strength. This action is so effective that, surprisingly, even a relatively mechanically unstable base layer containing vacuoles can be employed in the novel layer structure of the film without tear propagation and skin formation at the pot rim occurring.

The novel effect is only achieved with a flexible interlayer comprising polyolefins of low melting point or low Tg. An interlayer comprising the same or higher-melting polypropylene homopolymer as the base layer does not improve the tear propagation strength of the film and the problem of skin formation.

In a further advantageous embodiment, the propylene polymers employed in the opaque layer and/or interlayer are partially degraded by the addition of organic peroxides. A measure of the degree of degradation of the polymer is the degradation factor A, which gives the relative change in melt flow index, measured in accordance with DIN 53 735, of the polypropylene, based on the starting polymer.

$$A \frac{MFI_2}{MFI_1}$$

$MFI_1$ = melt flow index of the propylene polymer before addition of the organic peroxide $MFI_2$ = melt flow index of the peroxidically degraded propylene polymer According to the invention, the degradation factor A of the propylene polymer employed is in a range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy) hexane and di-t-butyl peroxide.

In addition to the opaque base layer and the novel interlayer, the novel film comprises at least one peelable top layer. For the purposes of the present invention, the top layer is an outer layer, so that the outer surface of the top layer forms one of the two film surfaces.

The peelable top layer of the novel multilayer film generally comprises a mixture or blend, described below in greater detail, of two incompatible olefinic polymers (components I and II) and, if desired, additives. For the purposes of the present invention, "incompatible" means that the two components form two separate phases. In general, the top layer comprises at least 70% by weight, preferably from 75 to 100% by weight, in particular from 90 to 98% by weight, of said mixture and, if desired, conventional additives in effective amounts in each case. The above % by weight data are based on the weight of the top layer.

Component I of the peelable top layer mixture or blend is, for example, a copolymer of
    ethylene and propylene or
    ethylene and butylene or
    propylene and butylene or
    ethylene and another -olefin having 5 to 10 carbon atoms or
    propylene and another -olefin having 5 to 10 carbon atoms or a terpolymer of
    ethylene and propylene and butylene or
    ethylene and propylene and another -olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

Component I particularly preferably essentially comprises a copolymer of
ethylene and propylene or
ethylene and 1-butylene or
propylene and 1-butylene or
a terpolymer of
ethylene and propylene and 1-butylene or
a mixture of two or more of said particularly preferred homopolymers, copolymers and terpolymers or a blend of two or more of said particularly preferred homopolymers, copolymers and terpolymers, if desired mixed with one or more of said homopolymers, copolymers and terpolymers, particular preference being given to propylene homopolymer or random ethylene-propylene copolymers having an ethylene content of from 2 to 10% by weight, preferably from 5 to 8% by weight, or random propylene-1-butylene copolymers having a butylene content of from 4 to 25% by weight, preferably from 10 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the total weight of the terpolymer, or a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend.

The above-described copolymers and terpolymers generally have a melt flow index of from 1.5 to 30 g/10 min, preferably from 3 to 15 g/10 min. The melting point is in the range from 120 to 140 C. The above-described blend of copolymers and terpolymers has a melt flow index of from 5 to 9 g/10 min and a melting point of from 120 to 150 C. All the abovementioned melt flow indices are measured at 230 C. and a force of 21.6 N (DIN 53 735).

Component II of the peelable top layer mixture is a polymer which is incompatible with the above-described olefinic polymers and is built up predominantly from ethylene sequences. For the purposes of the present invention, "incompatible polymer" means that the incompatible polymer is in the form of a separate phase alongside the olefinic polymer. Preference is given to HDPE, MDPE, LDPE, LLDPE and VLDPE. In general, these ethylene polymers contain a small amount of <10% by weight, preferably from 1 to 8% by weight, of comonomer. Suitable comonomers are olefins having 3 to 10 carbon atoms, preferred comonomers being propene, 1-butene and/or 1-hexene.

The blend or mixture of the incompatible components I and II generally shows two separate melting peaks in a melting diagram recorded by DSC. The first melting peak is in the range from 105 to 135 C. and the second melting peak in the range from 120 to 140 C.

The ratio (weight ratio) between the two incompatible polymers I and II in the top layer mixture or blend can vary within broad limits, depending on the peel force desired. The component I:II ratio is preferably in the range from 5:95 to 95:5, preferably from 30:70 to 70:30, in particular 50:50.

The novel film has at least three coextruded layers and always comprises, as essential layers, the opaque base layer layer, at least one flexible polyolefin interlayer and at least one peelable top. The choice of the number of layers depends primarily on the proposed application, particular preference being given to four- and five-layered embodiments. Particular preference is given to a four-layered structure, in which the opaque layer forms the base layer of the film and top layers are applied on both sides to the surfaces of base layer and interlayer.

The overall thickness of the film can vary within broad limits and depends on the intended use. The preferred embodiments of the novel film have overall thicknesses of from 5 to 200 μm, preferably from 10 to 100 μm, particularly preferably from 20 to 80 μm.

The thickness of the flexible interlayer is generally from 2 to 12 μm, preferably from 3 to 8 μm, in particular from 3 to 6 μm. It was found that the interlayer thickness of more than 2 um is specifically advantageous to achieve the desired cushioning effect of the intermediate layer.

The thickness of the peelable top layer is selected independently of other layers and is preferably in the range from 0.5 to 4.5 μm, in particular from 0.8 to 3 μm, particularly preferably from 0.5 to 2 μm.

Any top layer that may be applied to the opposite side has a thickness of from 0.1 to 5 μm, preferably from 0.1 to 2 μm, in particular from 0.1 to 1.0 μm.

For the purposes of the present invention, the base layer is the layer making up more than 50% of the total thickness of the film. Its thickness is the difference between the total thickness and the thickness of the top layer and interlayer(s) applied and can therefore vary within broad limits analogously to the total thickness. Top layers form the outermost layer of the film.

In order to further improve certain properties of the novel polypropylene film, both the base layer and the interlayer(s) and the top layer(s) can contain additives in an effective amount in each case, preferably hydrocarbon resin and/or antistatics and/or antiblocking agents and/or lubricants and/or stabilizers and/or neutralizers, which are compatible with the polymers of the core layer and of the top layer(s), with the exception of the antiblocking agents, which are generally incompatible. All amounts given below in weight percent (% by weight) are in each case based on the layer or layers to which the additive can be added.

A low-molecular-weight resin is preferably added to the base layer and/or interlayer(s). Hydrocarbon resins are low-molecular-weight polymers whose molecular weight is generally in a range of from 300 to 8000, preferably from 400 to 5000, especially from 500 to 2000. The molecular weight of the resins is thus significantly lower than that of the propylene polymers which form the principal component of the individual film layers and generally have a molecular weight of greater than 100,000. The proportion of the resin is in the range from 1 to 30% by weight, preferably from 2 to 10% by weight. The softening point of the resin is between 100 and 180 C. (measured in accordance with DIN 1995-U4, corresponding to ASTM E-28), preferably from about 120 to 160 C. Of the numerous low-molecular-weight resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for a long time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants, and phenol-modified terpene resins. Specific examples of terpenes which may be mentioned are pinene, -pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Hydrocarbon resins employed are also styrene homopolymers, styrene copolymers, cyclopentadiene homopolymers, cyclopentadiene copolymers and/or terpene polymers having a softening point of in each case above 135 C. (in the case of unsaturated polymers, the hydrogenated product is preferred). Very particular preference is given in the interlayers to cyclopentadiene polymers having a softening point of 140 C. or above.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by -hydroxy-$(C_1-C_4)$alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from 0.05 to 0.7% by weight. It is particularly preferred for the present invention to add tertiary aliphatic amines in an amount of from 0.4 to 0.6% by weight to the top layer(s). ®Armostat 600 is a particularly preferred antistatic.

Lubricants are higher aliphatic acid amides, higher aliphatic acid esters, waxes and metal soaps and polydimethylsiloxanes. The effective amount of lubricant is in the range from 0.1 to 3% by weight. Particularly suitable is the addition of higher aliphatic acid amides in the range from 0.15 to 0.25% by weight in the base layer and/or the top layers. A particularly suitable aliphatic acid amide is erucamide. The addition of polydimethylsiloxanes is preferred in the range from 0.3 to 2.0% by weight, in particular polydimethylsiloxanes having a viscosity of from 10,000 to 1,000,000 $mm^2/s$.

Stabilizers which can be employed are conventional compounds which have a stabilizing action for polymers of ethylene, propylene and other olefins. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

The antiblocking agents are preferably added to the top layer(s). Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from 0.1 to 7% by weight, preferably from 0.5 to 5% by weight. The mean particle size is between 1 and 6 $\mu$m, in particular 2 and 5 $\mu$m, particles having a spherical shape, as described in EP-A-0 236 945 and DE-A-38 01 535, being particularly suitable.

Neutralizers are preferably calcium stearate and/or calcium carbonate having a mean particle size of at most 0.7 $\mu$m, an absolute particle size of less than 10 $\mu$m and a specific surface area of at least 40 $m^2/g$.

The invention furthermore relates to a process for the production of the multilayer film according to the invention by the coextrusion process, which is known per se.

This process is carried out by coextruding the melts corresponding to the individual layers of the film through a flat-film die, taking off the resultant film over one or more rolls for solidification, subsequently, if desired, biaxially stretching (orienting) the film, heat-setting the biaxially stretched film and, if desired, appropriately flame-treating the surface layer intended for corona treatment.

Biaxial stretching (orientation) is preferred and can be carried out simultaneously or consecutively, consecutive biaxial stretching, in which stretching is carried out first longitudinally (in the machine direction) and then transversely (perpendicular to the machine direction), being particularly favorable.

First, as is customary in coextrusion, the polymer or polymer mixture of the individual layers is compressed and liquefied in an extruder, it being possible for any additives added to be already present in the polymer. The melts are then pressed simultaneously through a flat-film die (slot die), and the extruded multilayer film is drawn off over one or more take-off rolls, where it cools and solidifies.

The resultant film is preferably then stretched longitudinally and transversely to the extrusion direction, which results in alignment of the molecule chains. The stretching is preferably from 4:1 to 7:1 in the longitudinal direction and from 6:1 to 1 1:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by heat-setting (heat treatment), the film being kept at a temperature of from 110 to 150 C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of from 10 to 90 C., preferably from 20 to 60 C.

In addition, the longitudinal stretching is advantageously carried out at a temperature below 140 C., preferably in the range from 125 to 135 C., and the transverse stretching at a temperature above 140 C., preferably from 145 to 160 C.

If desired, one or both surfaces of the film can, as mentioned above, be corona- or flame-treated by one of the known methods after the biaxial stretching. For flame treatment with a polarized flame (cf. U.S. Pat. No. 4,622,237), a direct electric voltage is applied between a burner (negative pole) and a chill roll. The level of the applied voltage is between 500 and 3000 V, preferably in the range from 1500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

For the alternative corona treatment, the film is passed between two conductor elements serving as electrodes, such a high voltage, usually alternating voltage (about 10,000 V and 10,000 Hz), being applied between the electrodes that spray or corona discharges can occur. The spray or corona discharge ionizes the air above the film surface and reacts with the molecules of the film surface, causing formation of polar inclusions in the essentially nonpolar polymer matrix. The treatment intensities are within the usual range, preferably from 38 to 45 mN/m.

The novel multilayer film is distinguished by good seal seam strength and tear propagation strength. At the same time, the film has excellent peelabilty. Surprisingly, no skins of film residues are formed on the container edge.

Furthermore, the film has low light transparency in the region of UV radiation of from 200 to 380 nm. This transparency is less than 5%, preferably less than 2%, and is essential for the packaging of light-sensitive foods, for example dairy products.

Also important is a low minimum heat-sealing temperature, which enables heat-sensitive foods to be packaged under mild conditions. The peeling raw material should therefore heat-seal to itself at a temperature below 130 C., preferably below 115 C.

It has been found that the peelable top layer heat-sealed not only to itself and to conventional heat-sealable top layers of propylene copolymers and/or terpolymers, but surprisingly the film also heat-seals very well to surfaces of propylene homopolymers, which cannot themselves be heat-sealed either to themselves nor to conventional heat-sealing layers. This makes it possible to use the novel film as a lid for containers made from propylene homopolymer and thus to extend the use of single-material packaging made from polypropylene to containers with lids, such as yoghurt pots, etc.

The invention is now described by means of the examples below.

EXAMPLE 1

A four-layer film having the layer structure ABCD, i.e. the base layer B was surrounded by the top layer A and the interlayer C, was extruded as the sum by the coextrusion process from a flat-film die at an extrusion temperature of 260 C. The top layer D was extruded onto the interlayer C. The top layer D was corona-treated.

The essential components of the base layer B were:

| | |
|---|---|
| 92.70% by weight | of propylene homopolymer (PP) having an n-heptane-soluble content of 4.5% by weight (based on 100% of PP) and a melting point of 165 C.; the melt flow index of the propylene homopolymer was 3.2 g/10 min at 230 C. and a load of 21.6 N (DIN 53 735); |
| 7.15% by weight | of TiO$_2$ via Masterbatch ®P 8555 LM, supplier Schulman GmbH, Hüttenstraße 211, D-54578 Kerpen, Germany; |
| 0.15% by weight | of N,N-bis(2-hydroxyethyl)(C$_{10}$–C$_{20}$)alkylamine (®Armostat 300). |

The interlayer C comprised

| | |
|---|---|
| 100% by weight | of a random ethylene-propylene copolymer from Solvay (Eltex PKS 409) has an ethylene content of 4.5% by weight. The melt flow index of the copolymer is 3.7 g/10 min at 230 C. and a load of 21.6 N (DIN 53 735). |

The top layer on side A comprised

| | |
|---|---|
| 50% by weight | of a random ethylene-propylene copolymer from Solvay (Eltex PKS 409) having an ethylene content of 4.5% by weight |
| 40% by weight | of an ethylene-butylene copolymer from Mitsui (Tafmer A 4085) |
| 10% by weight | of an LDPE from Borealis LE 4004. |

The top layer on side D comprised a random ethylene-propylene copolymer having an ethylene content of 5% by weight, based on the weight of the copolymer. The melting point of the copolymer was 134 C., and the melt flow index was 7.0 g/10 min.

All layers contained 0.12% by weight of pentaerythrityl tetrakis[4-(3,5-di-tert-butyl-4-hydroxyphenyl)propionate] (®Irganox 1010) as stabilizer and 0.06% by weight of calcium stearate as neutralizer.

After coextrusion, the extruded four-layer film was taken off over the corresponding process steps via a first take-off roll and a further trio of rolls and was cooled, subsequently stretched longitudinally, stretched transversely, set and corona-treated, the following conditions, in detail, being selected:

| | |
|---|---|
| Extrusion: | extrusion temperature 260 C. |
| Longitudinal stretching: | stretching roll T = 135 C. |
| | longitudinal stretching by a factor of 6 |
| Transverse stretching: | heat-up zones T = 180 C. |
| | stretching zones T = 177 C. |
| | transverse stretching by a factor of 8 |
| Setting: | temperature T = 155 C. |
| Corona treatment: | voltage: 10,000 V |
| | frequency: 10,000 Hz |

The multilayer film produced in this way had a surface tension of from 40 to 41 mN/m (side D) directly after production. The film was about 56 μm thick, the thickness of layer A being about 1.5 μm, that of layer D being about 0.5 μm, and that of interlayer C being about 4 μm.

Comparative Example

Example 1 was repeated without an interlayer, ie a film comprising only three layers was produced, with the same base layer and the same top layers A and D as described in Example 1.

Applicational Testing

The following measurement methods were used in order to characterize the raw materials and the films:

Melt Flow Index

The melt flow index was measured in accordance with DIN 53 735 at a load of 21.6 N and at 230 C.

Melting Point

DSC measurement, maxima of the melting curve, heating rate 20 K/min.

Gloss

The gloss was determined in accordance with DIN 67 530. The reflector value was measured as an optical parameter for the surface of a film. In accordance with the ASTM-D 523-78 and ISO 2813 standards, the angle of incidence was set at 20 or 60. A light beam hits the planar test surface at the set angle of incidence and is reflected or scattered thereby. The light beams incident on the photo-electronic receiver are indicated as a proportional electrical quantity. The measurement value is dimensionless and must be specified together with the angle of incidence.

Bursting Pressure

In order to determine the bursting pressure, the pot sealed by means of a lid film is inflated until the pot, seal seam or lid bursts owing to cracking.

Seal Seam Strength and Peel Strength

In order to determine the seam strength of the film, two film strips 15 mm in width were laid one on top of the other and sealed for 0.5 s at 130 C. and a sealing pressure of 10 N/mm$^2$ (Brugger NDS unit, sealing jaws heated on one side). The seal seam strength was determined by the T-peel method.

In order to determine the strength of the seal seam to propylene homopolymer pots, the film is sealed by means of the peel layer to the rim of a PP pot at 30 N/cm$^2$ and 0.5 sec. The peel strength was determined by the T-peel method.

Density

The density was determined in accordance with DIN 53 479, Method A.

Hot-tack

"Hot-tack" denotes the strength of a still-hot seal seam immediately after the sealing tools are opened. For the measurement, two pieces of film measuring 5×30 mm are laid one on top of the other and fixed at the ends with a clamping weight G of 100 g. A flat spatula is inserted between the film layers, and the measurement strip is fed between the sealing jaws via two deflection rolls. The sealing is then initiated, the spatula being withdrawn from between the layers as soon as the sealing jaws have closed. The sealing conditions set are 150 C. for the sealing temperature, 0.5 s for the sealing time and 30 N/cm$^2$ for the pressure. At the end of the sealing time of 0.5 s, the sealing jaws (area 20 cm$^2$) open automatically, and the sealed measurement strip is jerked forward by the loading weight as far as the deflection roll and at the same time peeled apart at a peel angle of 180. The hot-tack is the depth of delamination of the sealed seam in mm experienced during the above action of force.

Determination of the Minimum Sealing Temperature

Film samples are heat-sealed on to PP pots at different temperatures with the aid of a heated sealing jaw at a sealing pressure of 10 N/cm$^2$ and a sealing time of 0.5 s. The seal seam strength, i.e. the force necessary to separate the lid from the pot, is determined, the seal seam plane forming a right angle with the tension direction. The minimum sealing temperature is the temperature at which a seal seam strength of at least 0.5 N/15 mm is achieved.

Opacity and Whiteness

The opacity and whiteness are determined with the aid of an "ELREPHO" electric remission photometer from Zeiss, Oberkochem (DE), standard illuminant C, 2 standard observer. The opacity is determined in accordance with DIN 53 146. The whiteness is defined as W=RY+3RZ−3RX, where W=whiteness, RY, RZ and RX=corresponding reflection factors when the Y, Z and X color measurement filters respectively are used. The white standard used was a barium sulfate compact (DIN 5033, Part 9). A detailed description is given, for example, in Hansl Loos, "Farbmessung" [Color Measurement], Verlag Beruf und Schule, Itzehoe (1989).

Light Transparency

The light transparency was measured in accordance with ASTM-D 1003-77.

The table below shows the properties of the multilayer films of the examples.

TABLE

|  | Example 1 | Comparative Example |
|---|---|---|
| Minimum sealing temperature | 160 C. | 170 C. |
| Bursting pressure | 0.5 bar | 0.3 bar |
| Skin formation | none | yes |

We claim:

1. A multilayered polyolefin film comprising at least three coextruded polyolefinic layers comprising a base layer, an intermediate layer and a surface layer, wherein said base layer is opaque and said surface layer is an outermost peelable layer comprising two incompatible polyolefins, and said intermediate layer is applied between said opaque base layer and said peelable surface layer and wherein said intermediate layer is a flexible interlayer comprising at least 80% by weight of a polyolefin having a lower melting point or a lower glass transition temperature than the polyolefin of the base layer.

2. A multilayer film as claimed in claim 1, wherein the opaque base layer of the film comprises polyolefin in an amount of at least 50% by weight based on the weight of the opaque base layer.

3. A multilayer film as claimed in claim 1, wherein the opaque base layer of the multilayer film contains fillers in a maximum amount of 40% by weight.

4. A multilayer film as claimed in claim 1, wherein the base layer contains pigments having a mean particle diameter of from 0.01 to 1 μm.

5. A multilayer film as claimed in claim 1, wherein the base layer contains vacuole-initiating fillers having a mean particle diameter of from 1 to 6 μm.

6. A multilayer film as claimed in claim 1, wherein the peelable top layer comprises a mixture of two incompatible olefin polymers which are components I and II.

7. A multilayer film as claimed in claim 6, wherein component I is selected from the group consisting of
   a propylene homopolymer,
   a copolymer of
      ethylene and propylene,
      ethylene and butylene,
      propylene and butylene,
      ethylene and another α-olefin having 5 to 10 carbon atoms,
      propylene and another α-olefin having 5 to 10 carbon atoms, a terpolymer of
      ethylene and propylene and butylene,
      ethylene and propylene and another α-olefin having 5 to 10 carbon atoms, a mixture of two or more of said homopolymers, copolymers and terpolymers, and a blend of two or more of said homopolymers, copolymers and terpolymers.

8. A multilayer film as claimed in claim 6, wherein component II is a polymer which is incompatible with component I.

9. A multilayer film as claimed in claim 6, wherein the mixture of the two incompatible polymers has two separate melting peaks, the first melting peak being in the range from 105 to 135° C. and the second melting peak being in the range from 120 to 140° C.

10. A multilayer film as claimed in claim 1, wherein the melting point or glass transition temperature of the polyolefin of the intermediate layer is at least 10° C. lower than the melting point of the polyolefin of the base layer.

11. A multilayer film as claimed in claim 1, wherein the polyolefin of the intermediate layer has lower crystallinity than the polyolefin of the base layer.

12. A multilayer film as claimed in claim 1, wherein the intermediate layer has a thickness of from 2 to 12 µm.

13. A multilayer film as claimed in claim 1, wherein the polyolefin of the intermediate layer is crystalline, partially crystalline or amorphous.

14. A multilayer film as claimed in claim 1, wherein the polyolefin of the intermediate layer comprises mainly propylene units and at least one further olefin.

15. A multilayer film as claimed in claim 14, wherein the polyolefin comprises at least 60% by weight based on the weight of the polyolefin, of propylene units.

16. A multilayer film as claimed in claim 1, wherein the polyolefin of the intermediate layer comprises ethylene units.

17. A multilayer film as claimed in claim 16, wherein the polyolefin comprises at least 50% by weight of ethylene units.

18. A lid comprising a multilayered film as claimed in claim 1.

19. A method of producing the multilayer film as claimed in claim 1.

20. A food container comprising a multilayered film as claimed in claim 1.

21. A method of producing a food containing container comprising the application of the multilayered film as claimed in claim 1 on to a container as a lid.

* * * * *